United States Patent
Murata et al.

(10) Patent No.: US 6,629,355 B2
(45) Date of Patent: Oct. 7, 2003

(54) MACHINING METHOD AND MACHINING SYSTEM

(75) Inventors: Shintaro Murata, Nagoya (JP); Kazuyoshi Nagato, Toyoake (JP); Tatsuyuki Honda, Nishio (JP); Katsuji Yonekawa, Chiryu (JP)

(73) Assignee: Fuji Machine MFG. Co., Ltd., Chiryu (JP)

(*) Notice: Subject to any disclaimer, the term of this patent is extended or adjusted under 35 U.S.C. 154(b) by 137 days.

(21) Appl. No.: 09/780,356

(22) Filed: Feb. 12, 2001

(65) Prior Publication Data

US 2001/0021337 A1 Sep. 13, 2001

(30) Foreign Application Priority Data

Mar. 8, 2000 (JP) ......................... 2000-063914

(51) Int. Cl.[7] .............................................. B23Q 41/02
(52) U.S. Cl. ...................... 29/563; 29/564; 269/289 R; 409/219; 409/225; 409/903
(58) Field of Search ................... 29/331, 563, 564; 269/126, 289 R, 290; 414/225.01, 226.02, 222.01, 332, 799, 331.13; 409/197, 903, 219, 225

(56) References Cited

U.S. PATENT DOCUMENTS

| | | | | |
|---|---|---|---|---|
| 3,010,371 A | * | 11/1961 | Riedel et al. ............... | 409/158 |
| 3,530,571 A | * | 9/1970 | Perry .......................... | 29/563 |
| 3,576,540 A | * | 4/1971 | Fair et al. ..................... | 700/9 |
| 4,309,600 A | * | 1/1982 | Perry et al. ................. | 235/375 |
| 4,369,563 A | | 1/1983 | Williamson | |
| 4,612,690 A | * | 9/1986 | Baker .......................... | 29/33 P |
| 4,621,410 A | | 11/1986 | Williamson | |
| 4,645,391 A | * | 2/1987 | Fallert ........................ | 409/225 |
| 4,850,099 A | * | 7/1989 | Scollard ...................... | 29/563 |
| 4,964,766 A | * | 10/1990 | Turchan et al. ............. | 409/225 |
| 5,197,834 A | * | 3/1993 | Chase et al. ................ | 409/131 |
| 5,321,874 A | * | 6/1994 | Mills et al. ................. | 29/33 P |

* cited by examiner

Primary Examiner—Daniel W. Howell
(74) Attorney, Agent, or Firm—Oliff & Berridge, PLC

(57) ABSTRACT

A method of machining a plurality of workpieces in an unmanned manner, including the steps of holding, with a jig, a first one of the workpieces, attaching the jig holding the first workpiece, to a workpiece holding device of at least one machining device, so that the first workpiece is machined by the machining device, detaching, after the machining of the first workpiece, the jig holding the first workpiece, from the workpiece holding device, removing the first workpiece from the jig, and holding, with the jig, a second one of the workpieces, and repeating the attaching step, the detaching step, and removing step.

16 Claims, 12 Drawing Sheets

MACHINING METHOD AND MACHINING SYSTEM

BACKGROUND OF THE INVENTION

1. Field of the Invention

The present invention relates to a method and a system for machining (e.g., cutting or grinding) a workpiece with a machining device, and particularly to a method and a system suitable for machining a plurality of workpieces in an unmanned manner, i.e., without needing any human operators.

2. Discussion of Related Art

There is known a method and a system for machining, with a machining device, a number of workpieces in an unmanned manner. In one known example, a plurality of machining centers are arranged to provide a machining line, a plurality of workpieces are attached, in advance, to a plurality of blocks, respectively, and each block with one workpiece is carried in to, attached to, detached from, and carried out from, each of the machining centers, all by a robot. Though the robot may be adapted to additionally attach and detach a workpiece to and from each block, it is a general practice that a human operator attaches, in advance, a workpiece to each block and, after the workpiece attached to the each block is machined in an unmanned manner, the operator detaches the workpiece from the each block. In this machining method, the operator may attach and detach a number of workpieces to and from a number of blocks, respectively, in the daytime, and the workpieces attached to the blocks may be machined in an unmanned manner in the nighttime. In addition, it has been practiced to combine a conveying device and a robot, or employ a movable robot, to carry in, attach, detach, and carry out each workpiece to and from each of the machining centers.

However, the above-indicated machining method in which workpieces are attached in advance to blocks, respectively, suffers from a problem that each of the blocks needs to have a complicated structure. In addition, large-size equipments are needed to carry in, attach, detach, and carry out large-size blocks, which leads to increasing the cost of the equipments. Moreover, it is not always possible for a robot to carry in, attach, detach, and carry out each workpiece. Even in the case where a robot can do all of them, the robot may not stably hold a workpiece having a complicated structure, and an accident such as falling of the workpiece from the robot may occur during conveying of the workpiece. These problems most likely occur to the case where a machining line is provided by a plurality of machining centers which perform respective sorts of machining operations on each workpiece, but may occur to the case where each workpiece is machined by a single machining center, or to the case where each workpiece is machined by a machining device other than the machining center.

SUMMARY OF THE INVENTION

The present invention provides a machining method, a machining system, and a jig which have one or more of the following technical features that are described below in respective paragraphs given parenthesized sequential numbers (1) to (24). Any technical feature that includes another technical feature shall do so by referring, at the beginning, to the parenthesized sequential number given to the latter feature. However, the following technical features and the appropriate combinations thereof are just examples to which the present invention is by no means limited. In addition, in the case where one technical feature recites a plurality of items, it is not essentially required that all of those items be simultaneously employed. That is, it is possible to select and employ only a portion (one, two, . . . , but not all) of those items.

(1) According to a first feature of the present invention, there is provided a method of machining a plurality of workpieces in an unmanned manner, comprising the steps of holding, with a jig, a first one of the workpieces, attaching the jig holding the first workpiece, to a workpiece holding device of at least one machining device, so that the first workpiece is machined by the machining device, detaching, after the machining of the first workpiece, the jig holding the first workpiece, from the workpiece holding device, removing the first workpiece from the jig, and holding, with the jig, a second one of the workpieces, and repeating the attaching step, the detaching step, and removing step.

In the present machining method, the jig holds the workpiece, and the Jig holding the workpiece is attached to, and detached from, the workpiece holding device of the machining device. The workpiece held by the jig can be more easily and more reliably attachd and detached than the case where a workpiece is directly attached and detached. In addition, the jig has a simpler structure than that of the previously-described block which holds a plurality of workpieces, and can be used repeatedly. Thus, the present machining method can machine a plurality of workpieces in an unmanned manner without increasing the cost of equipment.

(2) According to a second feature of the present invention that includes the first feature (1), the attaching step comprises attaching the jig holding the first workpiece, to a workpiece holding device of each of a plurality of machining devices which are arranged to provide a machining line, while automatically moving the jig from an upstream one of the machining devices to a downstream one of the machining devices, so that the first workpiece is machined by the each of the machining devices.

After the workpiece is held by the jig, the jig holding the workpiece is attached to each of the plurality of machining devices, and is machined by the each machining device. In this case, the above-indicated advantage of the present invention is amplified. However, this feature is not essential. For example, a jig replacing device which replaces the current jig holding the current workpiece, with a new jig, may be provided at a place between two machining devices adjacent to each other along the machining line. In the latter case, one or more different portions of the workpiece can be machined.

(3) According to a third feature of the present invention that includes the first or second feature (1) or (2), the machining device, or each of the machining devices, comprises a machining center.

Since the machining center can perform a plurality of sorts of machining operations on a single workpiece, it is often used to machine a workpiece having a complex shape. However, it may be impossible, or not reliable if possible, to directly attach or detach the workpiece having the complex shape to and from the machining center. According to the present invention, the jig holding the workpiece is attached to, and detached from, the machining center, the workpiece can be machined in the unmanned manner with high reliability.

(4) According to a third feature of the present invention that includes the second or third feature (2) or (3), the attaching step comprises operating a movable robot which is movable along the machining line, to hold the jig holding the first workpiece, carry in the jig to the each of the machining devices, and attach the jig to the workpiece holding device of the each machining device, and the detaching step comprises operating the robot to hold the jig holding the first workpiece, detach the jig from the workpiece holding device of the each machining device, and carry out the jig.

Since the robot performs both carrying the jig holding the workpiece and attaching and detaching the jig to and from each machining device, the cost of equipment can be reduced.

(5) According to a fifth feature of the present invention that includes the fourth feature (4), the removing step further comprises operating the robot to hold the jig from which the first workpiece has been removed, and return the jig from the downstream machining device to the upstream machining device.

Since the robot additionally returns the jig from which the machined workpiece has been removed, the cost of equipment can be further reduced.

(6) According to a sixth feature of the present invention that includes the fourth or fifth feature (4) or (5), at least one of the holding step and the removing step comprises operating the robot to perform a corresponding one of attaching the first workpiece to the jig and removing the workpiece from the jig.

Since the robot performs at least one of attaching the first workpiece to the jig and removing the workpiece from the jig, the cost of equipment can be further reduced.

(7) According to a seventh feature of the present invention, there is provided a machining system, comprising at least one machining device which includes a workpiece holding device which holds a workpiece, a tool holding device which holds a tool, and a moving device which causes a relative movement between the workpiece held by the workpiece holding device and the tool held by the tool holding device, so that the workpiece is machined by the tool; a jig which includes a main body and a fixing device which fixes the workpiece to the main body; an attaching device which attaches the workpiece to the jig so that the fixing device fixes the workpiece to the main body and thus the jig holds the workpiece; a first conveying device which conveys the jig holding the workpiece, to the machining device, so that the jig is held by the workpiece holding device and the workpiece held by the jig is machined by the tool, and which receives, after the machining of the workpiece, the jig from the workpiece holding device and carries out the jig from the machining device; a removing device which removes the workpiece from the jig carried out by the first conveying device; and a second conveying device which returns the jig from which the workpiece has been removed, to the attaching device.

The present machining system can carry out the machining method according to the first feature (1).

(9) According to an eighth feature of the present invention that includes the seventh feature (7), the machining system comprises a plurality of the machining devices which are arranged in a direction from the attaching device to the removing device.

This feature is preferable to a manner in which each of the plurality of machining devices is provided with exclusive first and second conveying devices.

(9) According to a ninth feature of the present invention that includes the seventh or eighth feature (7) or (9), the first conveying device comprises a guide; and a movable robot including a movable carriage which is movable along the guide, and an operative portion which is supported by the carriage, receives the jig holding the workpiece, from the attaching device, attaches and detaches the jig to and from the workpiece holding device of the machining device, and transfers the jig to the removing device.

(10) According to a tenth feature of the present invention that includes the ninth feature (9), the second conveying device comprises the movable robot.

(11) According to an eleventh feature of the present invention that includes the ninth or tenth feature (9) or (10), the operative portion of the movable robot comprises a jig holder which holds the main body of the jig, and a workpiece holder which holds the workpiece, and selectively operates one of the jig holder and the workpiece holder.

Since the single movable robot has both the jig holder and the workpiece holder, the robot can perform at least one of attaching the workpiece to the jig and removing the workpiece from the jig, and can carry, attach, and detach the jig which holds the workpiece or from which the workpiece has been removed.

(12) According to a twelfth feature of the present invention that includes any one of the seventh to eleventh feature (7) to (11), the machining device comprises a machining center including a tool storing and selecting device which stores a plurality of tools and selects one of the tools; and a tool replacing device which automatically replaces the tool held by the tool holding device, with the tool selected by the tool storing and selecting device.

(13) According to a thirteenth feature of the present invention that includes any one of the seventh to twelfth feature (7) to (12), the fixing device of the jig continues to fix the workpiece without receiving an external action such as transmission of a force or supplying of an energy.

The present jig can be used such that after the jig holds the workpiece owing to the transmission thereto of a force, or the supplying thereto of energy, from an external device, the jig is separated from the external device so that the jig is conveyed and attached, to and detached from, the machining device.

(14) According to a fourteenth feature of the present invention that includes any one of the seventh to thirteenth feature (7) to (13), the fixing device comprises a clamp member which is engageable with the workpiece; and a clamp-member moving device which moves the clamp member to an operative position thereof where the clamp member engages the workpiece and thereby fixes the workpiece to the main body of the jig, and to an inoperative position thereof away from the operative position.

(15) According to a fifteenth feature of the present invention that includes the fourteenth feature (14), the attaching device comprises a jig holding device which holds the main body of the jig; a transferring device which transfers the workpiece to the jig held by the jig holding device; and an operating device which operates the clamp-member moving device of the jig to move the clamp member to the operative position thereof so that the clamp member fixes the workpiece to the main body of the jig.

The movable robot recited in the ninth feature (9) may be used as the transferring device.

(16) According to a sixteenth feature of the present invention that includes the fourteenth or fifteenth feature (14) or (16), the removing device comprises a jig holding device which holds the main body of the jig; an operating device which operates the clamp-member moving device of the jig to move the clamp member to the inoperative position thereof so that the clamp member releases the workpiece from the main body of the jig; and a receiving device which receives the workpiece from the jig held by the jig holding device.

The movable robot recited in the ninth feature (9) may be used as the receiving device.

(17) According to a seventeenth feature of the present invention that includes any one of the fourteenth to sixteenth features (14) to (16), the clamp-member moving device of the jig comprises a pressurized-liquid-operated actuator which is supplied with a pressurized liquid and moves the clamp member by utilizing a pressure of the liquid.

The pressurized-liquid-operated actuator may be of a double-action type in which an operative member thereof is moved in opposite directions by the pressure of the liquid, or of a single-action type in which an operative member thereof is moved in only one direction by the pressure of the liquid and is moved in the opposite direction by, e.g., an elastic force of a spring member.

(18) According to an eighteenth feature of the present invention that includes the seventeenth feature (17), the jig further comprises a liquid passage which is communicated with the pressurized-liquid-operated actuator; and a leakage preventing device which prevents, in a state in which the jig is not held by either of the attaching device and the removing device, the liquid from leaking from the liquid passage.

When the pressurized-liquid-operated actuator of the jig is operated by the operating device of the attaching device or the operating device of the removing device, the actuator needs to be connected to, and then disconnected from, a pressurized-liquid supplying device of the operating device. If the actuator remains disconnected from the supplying device, the pressurized liquid leaks from the liquid passage of the jig, naturally when the passage is further supplied with the pressurized liquid, or because of gravitational force exerted thereto when the passage is not supplied any more with the same. The present feature can avoid this problem.

(19) According to a nineteenth feature of the present invention that includes the eighteenth feature (18),the machining system further comprises a suction device which sucks a portion of the liquid that is present in a space outside the leakage preventing device; and an air supplying device which supplies air to the space.

The leakage preventing device can prevent the leakage of a portion of the liquid from a space inside the device, but cannot prevent the leakage of a portion of the liquid from a space outside the device. According to this feature, the suction device and the air supplying device cooperate with each other to suck air and replace the liquid outside the leakage preventing device, with the sucked air, thereby preventing the leakage of the liquid from the jig.

(20) According to a twentieth feature of the present invention that includes any one of the fourteenth to sixteenth feature (14) to (16), the clamp-member moving device comprises a spring member which applies an elastic force to the clamp member and thereby biases the clamp member toward the operative position thereof; and a clamp-release member which moves, owing to an external force exerted thereto, the clamp member to the inoperative position thereof against the elastic force of the spring member.

The present clamp-member moving device enjoys a simple construction.

(21) According to a twenty-first feature of the present invention that includes any one of the fourteenth to sixteenth feature (14) to (16), the clamp-member moving device comprises an externally threaded member and an internally threaded member which are threadedly engaged with each other, and one of the externally threaded member and the internally threaded member is connected to the clamp member and the other of the externally threaded member and the internally threaded member is rotatable about an axis line and is not movable in a direction parallel to the axis line.

The operating device of the attaching device or the operating device of the removing device may be provided by a rotating drive device.

(22) According to a twenty-second feature of the present invention that includes the twenty-first feature (21), the clamp-member moving device further comprises a rotation preventing device which is selectively switchable to a first state thereof in which the rotation preventing device prevents a rotation of the other of the externally threaded member and the internally threaded member and to a second state thereof in which the rotation preventing device permits the rotation.

The present clamp-member moving device can stably maintain the clamp member at the operative position thereof.

(23) According to a twenty-third feature of the present invention, there is provided a jig, comprising a main body; and a fixing device which continues to fix a workpiece to the main body without receiving an external action such as transmission of a force or supplying of an energy, the fixing device comprising a clamp member which is engageable with the workpiece; and a clamp-member moving device which moves the clamp member to an operative position thereof where the clamp member engages the workpiece and thereby fixes the workpiece to the main body, and to an inoperative position thereof away from the operative position, the clamp-member moving device comprising a spring member which applies an elastic force to the clamp member and thereby biases the clamp member toward the operative position thereof.

The present jig may employ any one of the seventeenth to twentieth features (17) to (20).

(24) According to a twenty-fourth feature of the present invention that includes the twenty-third feature (23), the clamp-member moving device further comprises a pressurized-liquid-operated actuator which is supplied with a pressurized liquid and moves, by utilizing a pressure of the liquid, the clamp member to the inoperative position thereof.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Figure 1:
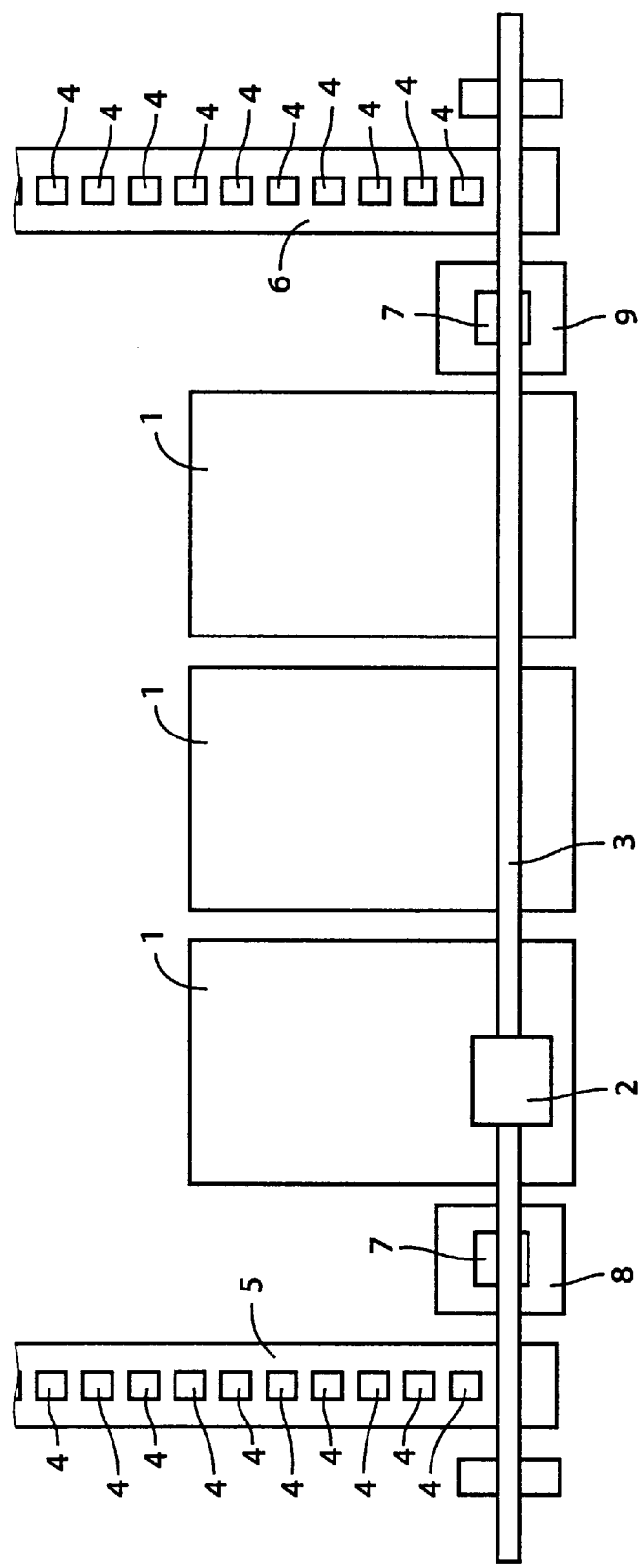
FIG. 1 is a schematic plan view of a machining system to which the present invention is applied.

FIG. 1 schematically illustrates a machining system to which the present invention is applied. The present machining system includes a machining line consisting of a plurality of (e.g., three) machining centers 1 arranged along a straight reference line. A movable-type robot 2 is movable in opposite directions parallel to the reference line. The robot 2 is movable along a guide 3 extending above the three machining centers 1, while performing prescribed operations. In a most upstream portion of the machining line, there is provided a workpiece carry-in device 5 which automatically carries in a plurality of workpieces 4 and positions each of the workpieces, at a prescribed position. In a most downstream portion of the machining line, there is provided a workpiece carry-out device 6 which receives each machined workpiece 4, at a prescribed position, and automatically carries out the received workpiece 4. Between the workpiece carry-in device 5 and the most upstream one of the three machining centers 1, there is provided an attaching device 8 which attaches each workpiece 4 to a jig 7. Between the workpiece carry-out device 6 and the most downstream one of the three machining centers 1, there is provided a removing device 9 which removes each workpiece 4 from the jig 7.

The robot 2 carries in the jig 7 with the workpiece 4 attached thereto by the attaching device 8, to each of the three machining centers 1, attaches and detaches the jig 7 to and from the each machining center 1, and carries out the jig 7 from the each machining center 1. In addition, the robot 2 returns the jig 7 from which the workpiece 4 was removed by the removing device 9, to the attaching device 8. Moreover, the robot 2 receives the workpiece 4 positioned at the prescribed position by the workpiece carry-in device 5, and transfers the workpiece 4 to the jig 7 positioned at the attaching device 8. Thus, the robot 2 functions as a transferring device as part of the attaching device 8. In addition, the robot 2 functions as a transferring device which receives the workpiece 4 from the jig 7 positioned at the removing device 9, and transfers the workpiece 4 to the workpiece carry-out device 6. Since each machining center 1 performs a complex machining operation including plural sorts of machining operations, on a workpiece 4, the each center 1 needs a lot of time to finish the complex machining operation. Therefore, the single robot 2 can do all needed operations, i.e., carrying in and carrying out the jig 7 and attaching and detaching the jig 7 to and from each machining center 1. However, in the case where the single robot 2 cannot do all needed operations, it is possible to employ a plurality of movable-type robots 2, or alternatively it is possible to employ an exclusive or special robot (i.e., "attaching" robot) which receives each workpiece 4 from the workpiece carry-in device 5 and attaches the each workpiece 4 to the jig 7, and/or a special robot (i.e., "removing" robot) which removes each workpiece 4 from the jig 7 and transfers the each workpiece 4 to the workpiece carry-out device 6.

Figure 2:
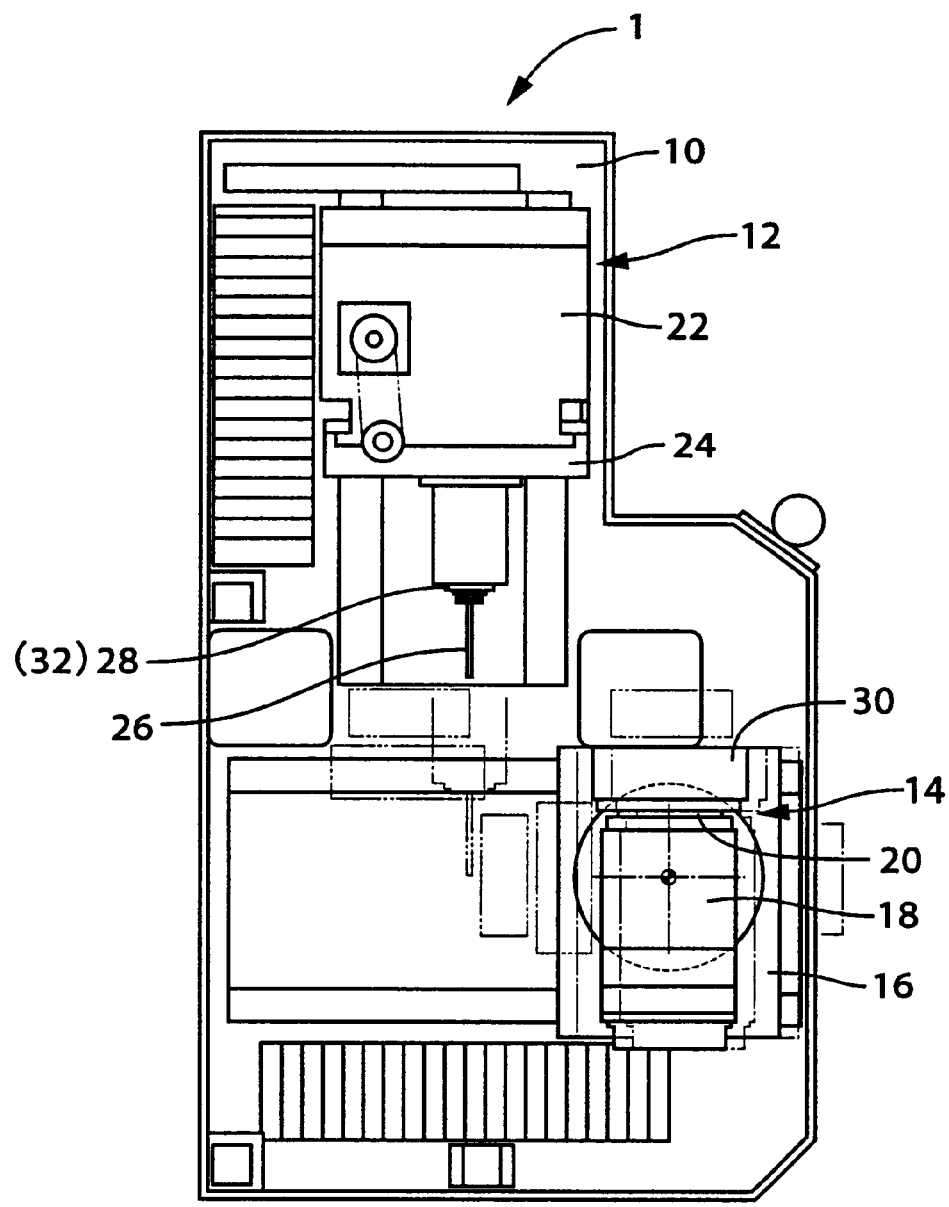
FIG. 2 is a plan view of each of three machining centers of the machining system.
Figure 3:
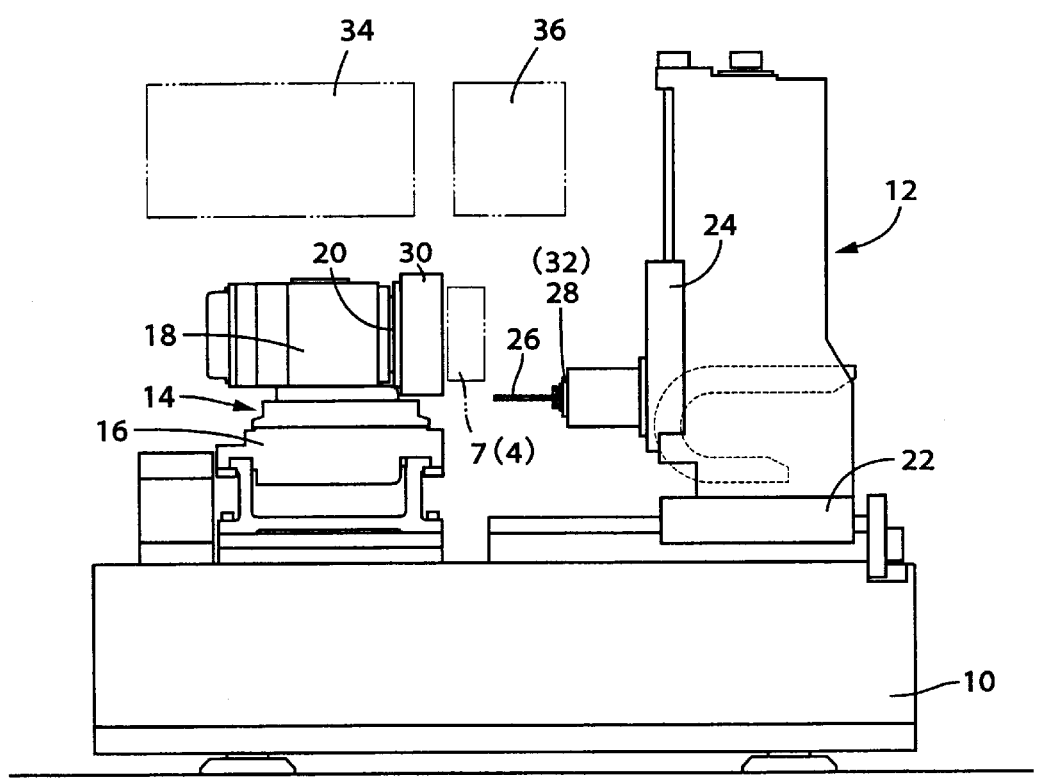
FIG. 3 is a front elevation view of each machining center.

As shown in FIGS. 2 and 3, each machining center 1 includes a bed 10 as a main frame; a tool rest 12 which holds and rotates a tool 26; and a workpiece rest 14 which holds the workpiece 4. The workpiece rest 14 includes an X-axis slide 16 which is movable in a horizontal, X-axis direction parallel to a lengthwise direction of the machining line; and a revolving table 18 which is provided on the X-axis slide 16 and is revolveable about a vertical axis line. The revolving table 18 is provided with a workpiece spindle 20 which holds the workpiece 4 and rotates the same 4 about an axis line parallel to a horizontal, Y-axis direction perpendicular to the X-axis direction. The tool rest 12 includes a Y-axis slide 22 which is movable in the Y-axis direction. The Y-axis slide 22 includes a vertical column which supports a Z-axis slide 24 such that the Z-axis slide 24 is movable in a Z-axis direction perpendicular to the X-axis and Y-axis directions. The Z-axis slide 24 is provided with a tool spindle 28 which holds the tool 26 and rotates the same 26 about an axis line parallel to the Y-axis direction. Each of the X-axis slide 16, the revolving table 18, the workpiece spindle 20, the Y-axis slide 22, and the Z-axis slide 24 is driven by a drive device including an electric servomotor as its drive source, and can be moved, revolved, or rotated to any arbitrary position or angle (i.e., angular position or phase). Those devices 16, 18, 20, 22, 24 cooperate with one another to provide a moving device which moves at least one of the workpiece 4 and the tool 26 relative to the other of the workpiece 4 and the tool 26, so that the workpiece 4 can be machined by the tool 26. The workpiece spindle 20 and the tool spindle 28 are provided with a workpice chuck 30 and a tool chuck 32, respectively, each of which is driven by a chuck drive device.

Each machining center 1 additionally includes a tool storing and selecting device 34 which stores plural sorts of tools and can select any arbitrary one of the stored tools and position the selected tool at a tool-replace position; and an automatic tool replacing device 36 which replaces the current tool 26 held by the tool spindle 28 with the tool selected by the tool storing and selecting device 34. Since, however, the tool storing and selecting device 34 and the tool replacing device 36 are well known in the art and are not relevant to the present invention, those devices 34, 36 are indicated at two-dot chain line in FIG. 3. The three machining centers 1 are controlled by a machining-center control device, not shown.

Figure 4:
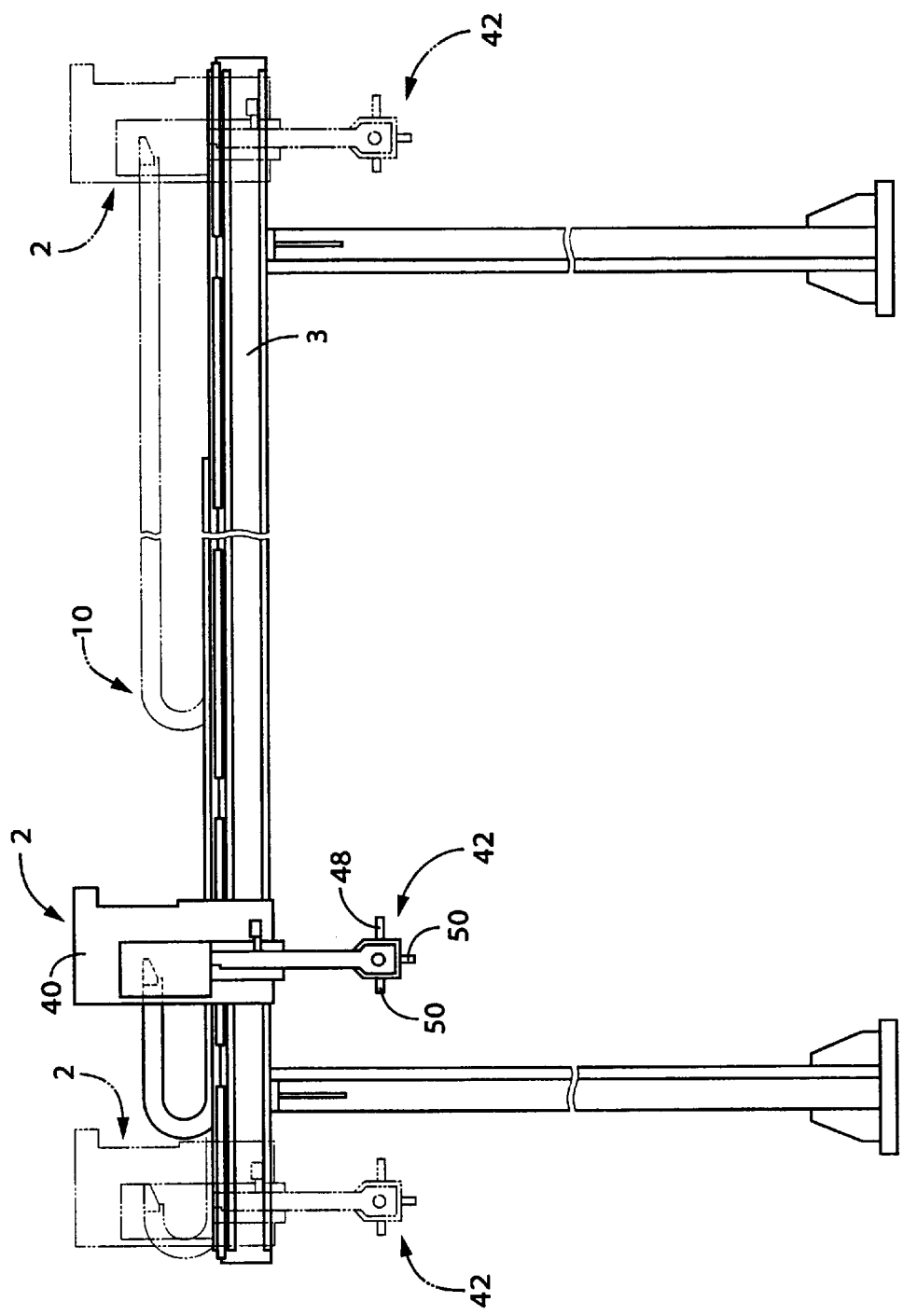
FIG. 4 is a front elevation view of a movable-type robot of the machining system.
Figure 5:
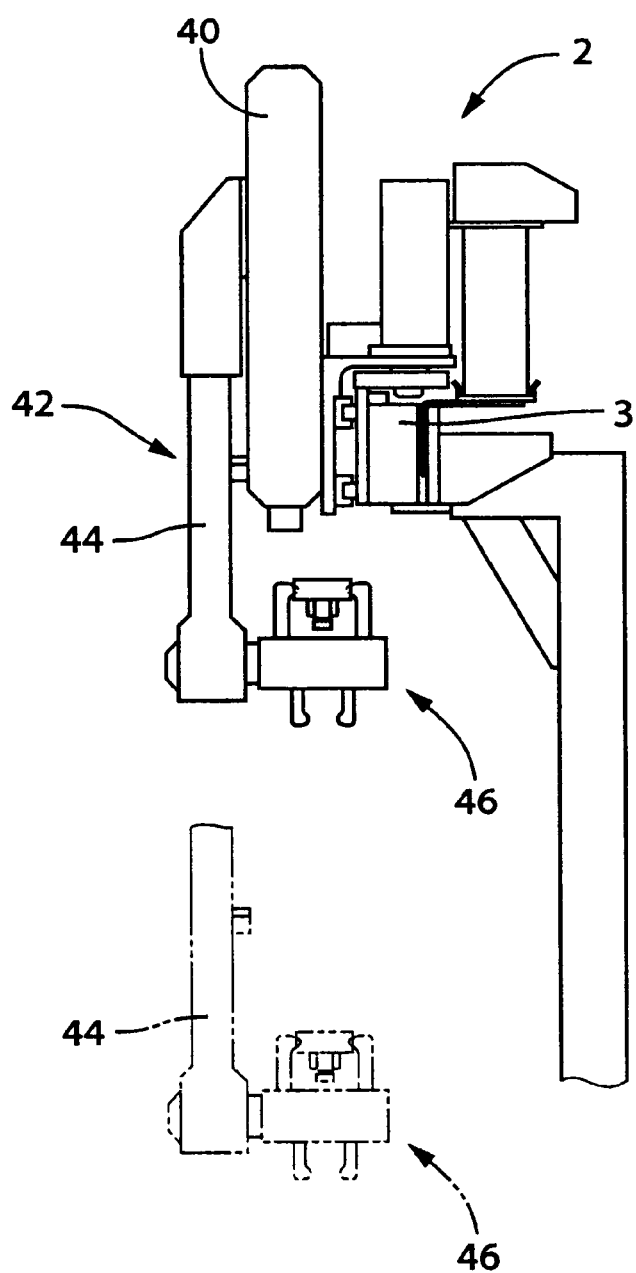
FIG. 5 is a side elevation view of the robot.
Figure 6:
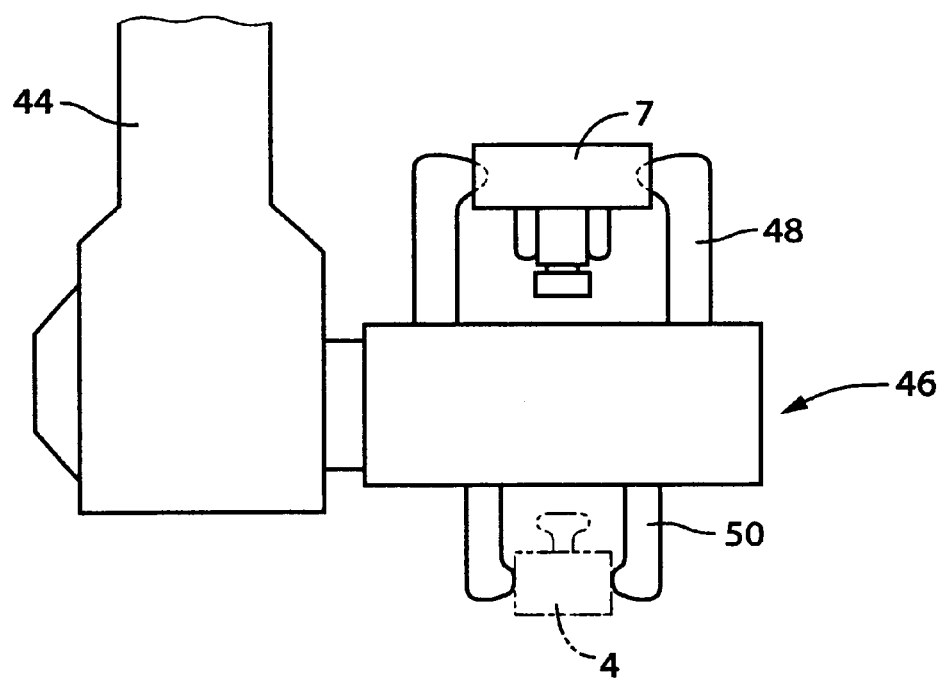
FIG. 6 is a front elevation view of a carrier chuck of the robot.

As shown in FIGS. 4 and 5, the robot 2 includes a carriage 40 which is movable along the guide 3; and an operative portion 42 which is supported by the carriage 40. The operative portion 42 includes an extensible and retractable arm 44 which is supported by the carriage 40 such that the arm 44 is vertical; and a carrier chuck 46 attached to a lower end of the arm 44. As shown in FIG. 6, the carrier chuck 46 includes two pairs of jig-hold jaws 48 (only one pair of jaws 48 are shown in FIG. 6) each as a jig-hold member that holds the jig 7; and two pairs of workpiece-hold jaws 50 (only one pair of jaws 50 are shown in FIG. 6) each as a workpiece-hold member that holds the workpiece 4. Thus, as shown in FIG. 4, the four pairs of jaws 48, 50 are provided around a horizontal axis member such that the four pairs of jaws 48, 50 are equiangularly (i.e., by 90 degrees) spaced from one another, and are revolved around the axis member. The carriage 40, the arm 44, and the carrier chuck 46 are moved or rotated by respective drive devices, not shown, which are controlled by a robot control device, not shown. The robot control device, the above-mentioned machining-center control device, and a carry-in-device and carry-out-device control device, not shown, which controls the workpiece carry-in device 5 and the workpiece carry-out device 6 are each essentially provided by a computer, and are controlled in relation with one another by a supervisor computer as a main control device, not shown.

Figure 7:
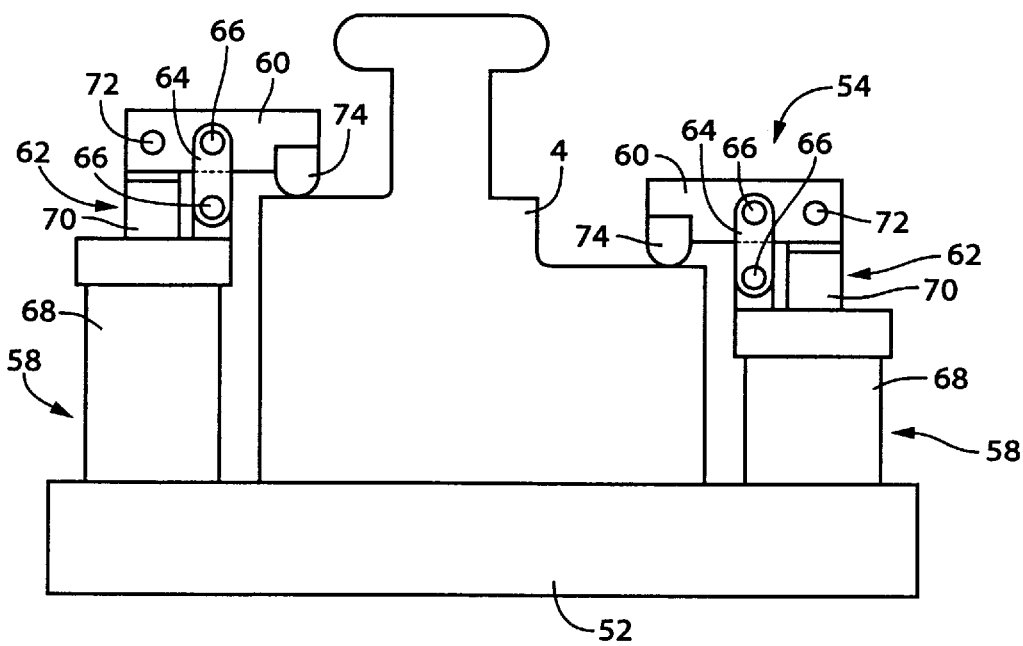
FIG. 7 is a front elevation view of a workpiece-hold jig as part of the machining system.

As shown in FIG. 7, the jig 7 includes a main body 52 having a rectangular shape in its plan view, and a fixing device 54. The main body 52 includes a positioning portion, such as a positioning hole or a positioning surface, which cooperates with a positioning portion of each of the workpiece chuck 30, the attaching device 8, and the removing device 9 to position the jig 7 relative to the each of those elements 30, 8, 9. Since, however, those positioning portions are well known in the art and are not relevant to the present invention, no description or illustration thereof is provided here. Though the main body 52 additionally includes an engageable portion which is engageable by each of the workpiece chuck 30 or the carrier chuck 46, no description or illustration thereof is provided here.

Figure 8:
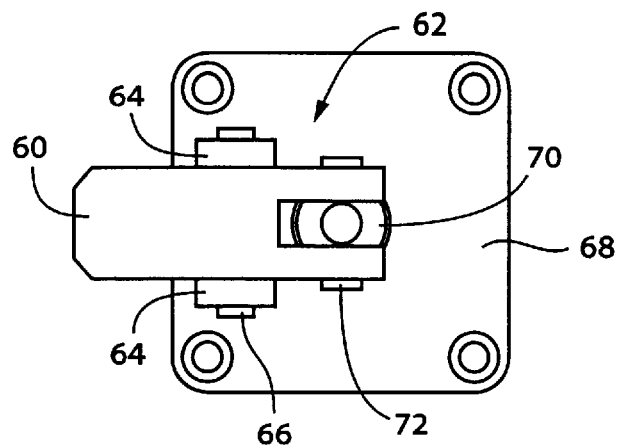
FIG. 8 is a plan view of each of two clamping devices of the jig.

The fixing device 54 includes a plurality of (e.g., two) clamping devices 58. Each of the clamping devices 58 includes a clamp member 60; and a clamp-member moving device 62 which moves or pivots the clamp member 60 to an operative position shown in FIG. 7 and to an inoperative position away from the operative position. The clamp-member moving device 62 is illustrated in detail in FIGS. 8 and 9. The clamp member 60 is connected to a housing 68 by a pair of links 64 and a pair of connect pins 66. In addition, the clamp member 60 is connected to an output rod 70 by a connect pin 72. Thus, in a state in which the output rod 70 is positioned at an extended position, indicated at solid line in FIG. 9, where the rod 70 is extended out of the housing 68, an engaging portion 74 as a free end portion of the clamp member 60 engages the workpiece 4 and presses the same 4 against the main body 52 of the jig 7; and in a state in which the output rod 70 is positioned at a retracted position, indicated at two-dot chain line in FIG. 9, where the rod 70 is retracted in the housing 68, the engaging portion 74 of the clamp member 60 is kept away from the workpiece 4, at a position laterally distant from a position right above the same 4.

Figure 9:
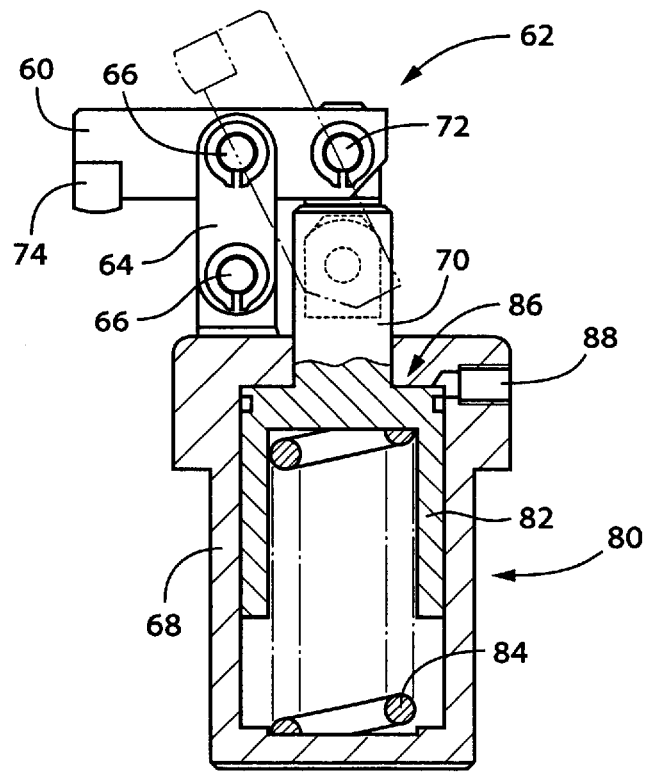
FIG. 9 is a partly cross-sectioned, front elevation view of each clamping device.

As shown in FIG. 9, the output rod 70 is extended and retracted out of and into the housing 68, by a single-action hydraulic cylinder 80 as a sort of pressurized-fluid-operated cylinder device. A piston 82 is liquid-tightly fitted in the housing 68 such that the piston 82 is slideable on an inner wall surface of the housing 68 and is biased by a compression coil spring 84 as a sort of spring member as a biasing device, to a stroke end thereof corresponding to the extended position of the piston rod 70. The coil spring 84 is given a preset load which can enable the clamp member 60 to fix sufficiently strongly the workpiece 4 to the main body 52, even during the machining operation, while reliably preventing the workpiece 4 from being moved because of a machining force exerted thereto from the tool 26. The housing has a hydraulic chamber 86 on one of both sides of the piston 82 that is opposite to the other side on which the coil spring 84 is provided. When the hydraulic chamber 86 is supplied with pressurized hydraulic oil via a connection port 88, the piston 72 is moved back in the housing 68, against the biasing force of the coil spring 84, so that the piston rod 70 is retracted into the housing 68 and the clamp member 60 is pivoted to its inoperative position.

Figure 10:
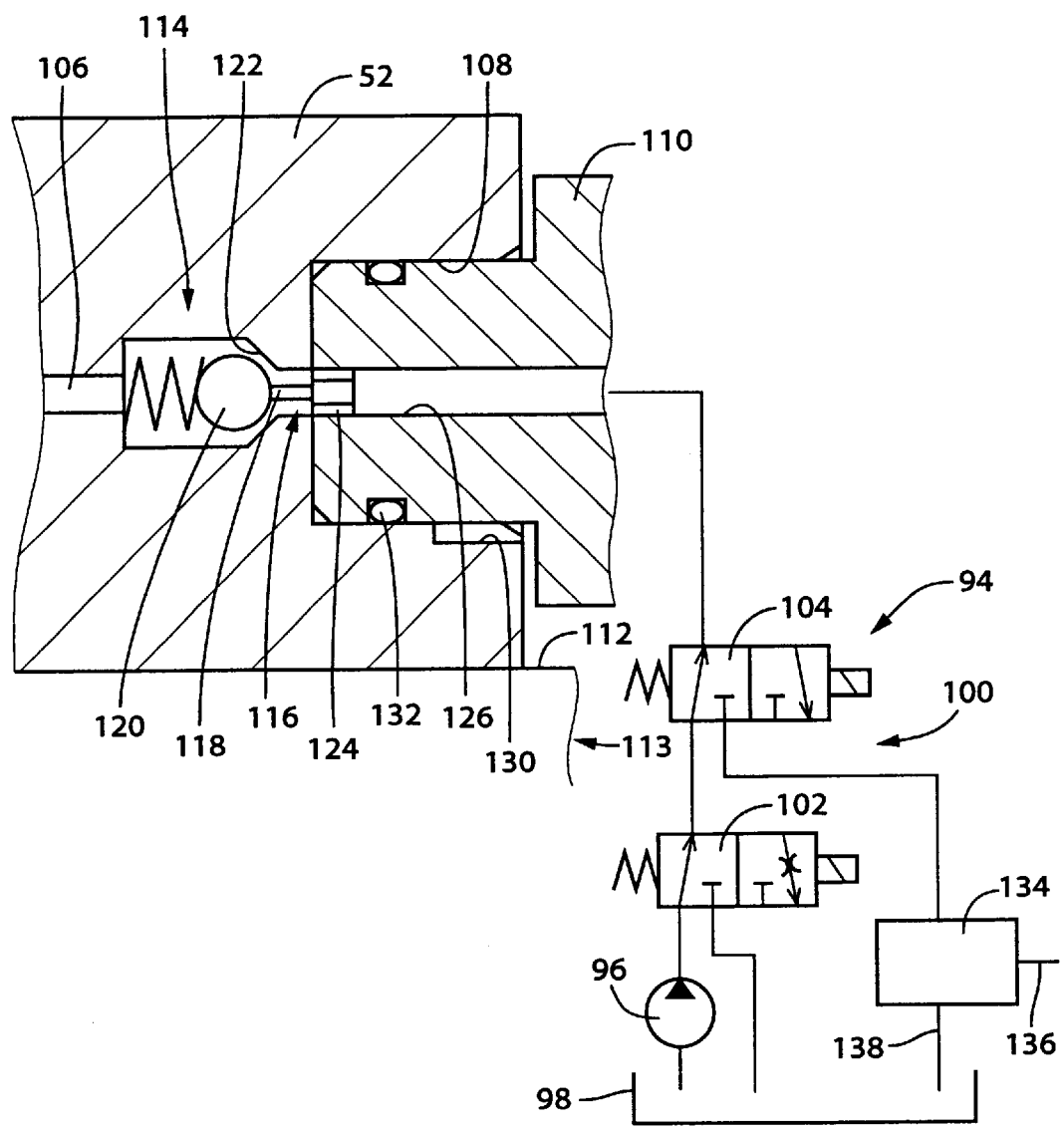
FIG. 10 is a diagrammatic view of a hydraulic circuit of an operating device which operates the two clamping devices.

The single-action hydraulic cylinder 80 is operated by each of respective operating devices 94 as respective parts of the attaching device 8 and the removing device 9. As shown in FIG. 10, each of the operating devices 94 includes a hydraulic pump 96 as a hydraulic-pressure source that pumps up the hydraulic oil from a tank 98. The hydraulic pump 96 includes a relief valve which defines a maximum pressure of the hydraulic oil output from the pump 96. The hydraulic oil output from the pump 96 is controlled by a control-valve device 100. In the present embodiment, the control-valve device 100 includes two solenoid-operated switch valves 102, 104. The main body 52 of the jig 7 has an oil passage 106 which introduces the hydraulic oil. One end of the oil passage 106 is connected to each of the respective connect ports 88 of the two clamping devices 58 via piping, not shown, and the other end of the passage 106 ends with a connect port 108. The hydraulic pump 96 is connected to an autocoupler 110 via the switch valves 102, 104. After the jig 7 is placed on a jig-support surface 112 of a main body of the attaching device 8 or the removing device 9 and is fixed thereto by a fixing device, not shown, the autocoupler 110 is moved by a moving device, not shown, to a connected position, shown in FIG. 10, where the coupler 110 is connected to the connect port 108 of the main body 52 of the jig 7, and to a disconnected position where the coupler 110 is disconnected from the port 108.

Between the oil passage 106 and the connect port 108, there is provided a check valve 114 as a leakage preventing device. The check valve 114 permits the hydraulic oil to flow in a first direction toward the single-action hydraulic cylinder 80, but inhibits the oil from flowing in a second direction opposite to the first direction. This checking function of the check valve 114 is eliminated when the autocoupler 110 is connected to the connect port 108. The coupler 110 includes a valve-open member 116 whose pin 118 engages, in a state in which the coupler 110 is fitted in the port 108, a valve member 120 of the check valve 114 and keeps the valve 114 away from a valve seat 122. The valve-open member 116 is fixed to the coupler 110 such that a base portion 124 of the member 116 is press-fitted in an oil passage 126 of the coupler 110. Since the base portion 124 of the valve-open member 116 has a number of radial fins and those radial fins are press-fitted in the oil passage 126, the base portion 124 does not obstruct the flow of the hydraulic oil.

An axial recess 130 is formed in a lower portion of an inner wall surface of the connect port 108. The axial recess 130 has an axial length which assures that till the autocoupler 110 is moved back to an air-flow-in-start position where the check valve 114 is just closed, the recess 130 does not communicate with an O-ring 132 as a seal member of the coupler 110 and, when the coupler 110 is moved back a little more and reaches that position, the recess 130 permits ambient air to flow in the oil passage 126. Meanwhile, the switch valve 104 is connected to not only the switch valve 102 and the hydraulic pump 96 but also a suction device 134 which generates, owing to a pressurized air supplied from an air-supply passage 136, a negative pressure according to Bernoulli's theorem. In a state in which the suction device 134 is communicated with the autocoupler 110, the hydraulic oil present in the oil passage 126 is sucked by the suction device 134. The suction device 134 includes an oil separator which separates the air and the hydraulic oil from each other, and the separated oil is returned to the tank 98 via a return passage 138.

Therefore, when the autocoupler 110 is moved back to the above-mentioned air-flow-in-start position, in the state in which the suction device 134 is communicated with the oil passage 126 and the air-supply passage 136 is supplied with the pressurized air, the hydraulic oil present in the oil passage 126 is sucked with the air flowing in from the recess 130, so that the connect port 108, the oil passage 126, and the switch valve 104 are freed of the oil. In addition, with the autocoupler 110 being at the air-flow-in-start position, the check valve 114 of the main body 52 of the jig 7 has already been closed as described above. Therefore, the hydraulic oil present in the main body 52 does not leak. The autocoupler 110 is operated in such a manner that the coupler 110 is temporarily stopped at the air-flow-in-start position. Therefore, after the hydraulic oil is fully sucked, the coupler 110 is disconnected from the connect port 108. Thus, the hydraulic oil is prevented from leaking from the clamping devices 58 or contaminating one or more peripheral devices.

The machining system constructed as described above is operated to carry out a machining method, described below, to which the present invention is also applied. The workpiece carry-in device 5 carries in, to the present machining line, each workpiece 4 which was produced by a workpiece producing device and was placed on the carry-in device 5, or each workpiece 4 which was automatically supplied by a workpiece supplying device from a workpiece storing device in which a number of workpieces 4 are stored, and was placed on the carry-in device 5.

The attaching device 8 has the jig-support surface 112 (FIG. 10) on which the jig 7 with no workpiece 4 is positioned at a prescribed position and is fixed by a simple fixing device. Thus, the main body of the attaching device 8 that has the jig-support surface 112 and the fixing device provided on the main body cooperate with each other to provide a jig-main-body holding device 113 which holds the main body 52 of the jig 7. Then, the operating device 94 of the attaching device 8 is operated as follows: First, the autocoupler 110 is connected to the connect port 108, so that the two oil passages 106, 126 are communicated with each other and the check valve 114 is opened. Subsequently, the hydraulic pump 96 is operated to output the hydraulic oil, so that the oil is supplied to the hydraulic chamber 86 of the single-action hydraulic cylinder 80 of each of the two clamping devices 58 via the two switch valves 102, 104 which are currently placed in their normal positions. Thus, the respective pistons 82 of the two claming devices 58 are moved back against the respective biasing forces of the respective coil springs 84. Consequently the two clamp members 60 are pivoted to their inoperative positions, and the space above the main body 52 of the jig 7 is fully opened.

The movable-type robot 2 picks up the workpiece 4 carried in, and positioned at the prescribed position, by the workpiece carry-in device 5, and places the workpiece 4 at the prescribed position on the thus opened main body 52 of the jig 7. An appropriate fixing device, such as a positioning pin and a positioning hole, accurately positions the workpiece 4 relative to the main body 52 of the jig 7.

After the carrier chuck 46 of the robot 2 has released the workpiece 4, the hydraulic pump 96 is stopped, and the switch valve 102 is so switched as to communicate the respective hydraulic chambers 86 of the respective single-action hydraulic cylinders 80 of the two clamping devices 58, with the tank 98, so that the oil flows out of the chambers 86 and the respective pistons 82 of the two clamping devices 58 are moved forward. Since the switch valve 102 includes a flow restrictor, the rate of flow of the oil is limited, so that the pistons 82 are moved at a low speed and the clamp members 60 engage the workpiece 4 at an appropriate speed. In addition, since the respective coil springs 84 of the two claming devices 58 are given an appropriate preset load, the clamp members 60 engage the workpiece 4 with an appropriate engaging force. Thus, the workpiece 4 is not damaged by the clamping members 60.

Subsequently, the switch valve 104 is so switched as to communicate the suction device 134 with the autocoupler 110. A pressurized air is supplied to the suction device 134, and the autocoupler 110 is moved back to the air-flow-in-start position and is temporarily stopped there. Thus, the hydraulic oil remaining around the connect port 108 is sucked by the suction device 134. Finally, the autocoupler 110 is disconnected from the connect port 108, the supplying of the pressurized air to the suction device 134 is stopped, and the switch valves 102, 104 are returned to their normal positions. Thus, the operating device 94 is returned to its initial state.

After the fixing device of the attaching device 8 releases the jig 7, the robot 2 goes and waits around the most upstream one of the three machining centers 1, while holding the jig 7 with the workpiece 4. After the most upstream machining center 1 has finished its machining operation on the current workpiece 4 held by the current jig 7, the current jig 7 holding the machined workpiece 4 is replaced with the next jig 7 held by the robot 2, in a state in which the revolving table 18 has been revolved to an angular position where he axis line of the workpiece spindle 20 of the machining center 1 is parallel to the X-axis direction, as indicated at two-dot chain line. The carrier chuck 46 is lowered to a position in front of the workpiece chuck 30 and, first, the pair of jig-hold jaws 48 of the carrier chuck 46 that currently do not hold a jig 7 are revolved to face the workpiece chuck 30, and are opened, and then an appropriate one of the workpiece chuck 30 and the carrier chuck 46 is moved toward the other chuck, by either movement of the X-axis slide 16 or the carriage 40. In the present embodiment, it is assumed that the carriage 40 is moved to move the carrier chuck 46 toward the workpiece chuck 30.

Thus, the two jig-hold jaws 48 of the carrier chuck 46 are positioned on both sides of the current jig 7 held by the workpiece chuck 30. The jig-hold jaws 48 are not interfered with by the jaws of the workpiece chuck 30, because the jig-hold jaws 48 and the jaws of the chuck30 are so positioned relative to each other as not to interfere with each other. After the jaws of the chuck 30 are opened and the jig-hold jaws 48 are closed, the carrier chuck 46 is moved away from the workpiece chuck 30. Thus, the current jig 7 is detached from the chuck 30. Then, the carrier chuck 46 is revolved by 90 degrees about its axis member, so that the next jig 7 holding the next workpiece 4 faces the workpiece chuck 30. In this state, the carrier chuck 46 is moved toward the workpiece chuck 30, and the next jig 7 is attached to the latter chuck 30. The robot 2 conveys the jig 7 detached from the most upstream machining center 1, to the second upstream (or middle) machining center 1, and replaces the jig 7 with the jig 7 which is currently held by the workpiece chuck 30 of the second upstream machining center 1.

The above-described steps are repeated, and eventually the jig 7 is detached from the most downstream machining center 1. Then, the robot 2 transfers the jig 7 to the removing device 9. The removing device 9 includes a jig-main-body holding device identical with the jig-main-body holding device 113 of the attaching device 8, that is, including a jig-support surface 112 and a fixing device (not shown); and an operating device identical with the operating device 94 of the attaching device 8. The operating device 94 of the removing device 9 is connected to the jig 7 whose min body 52 is held by the jig-main-body holding device 113 of the removing device 9, to unclamp the two clamping devices 58 of the fixing device 54 of the jig 7. From the thus unclamped jig 7, the workpiece 4 is removed by the robot 2, and is transferred by the same 2 to the workpiece carry-out device 6. Subsequently, the robot 2 receives the jig 7 released from the fixing device of the removing device 9, conveys the jig 7 upstream along the machining line, and transfers the jig 7 to the attaching device 8. Thus, one cycle of machining operation is finished. This cycle is fully automatically controlled by the cooperation of the machining-center control device, the carry-in-device and carry-out-device control device, and the main control device. That is, the present machining system can machine a plurality of workpieces 4, one after another, in a fully unmanned manner. Therefore, if a human operator stores, in the daytime, a prescribed number of workpieces in a workpiece storing device, the present machining system machines, in the nighttime, each of the workpieces stored in the workpiece storing device, in a fully unmanned manner, and stores the machined workpieces in another workpiece storing device.

As described previously, after the suction device 134 sucks the hydraulic oil, air remains in the oil passage 126 between the switch valve 104 and the autocoupler 110. If, in this state, the coupler 110 is coupled with the jig 7 and the hydraulic oil is supplied from the hydraulic pump 96, the air remaining in the oil passage 126 is supplied with the oil to the single-action hydraulic cylinder 80. Since, however, the connect port 88 of the cylinder 80 is formed through the top end portion of the hydraulic chamber 86, the air is first discharged from the chamber 86 and then the oil is discharged from the chamber 86, when the coil spring 84 moves the piston 82 in an upward direction in the chamber 86. Thus, the air does not accumulate in the chamber 86.

It emerges from the foregoing description that the movable-type robot 2 provides not only a first conveying device which carries in the jig 7 holding the workpiece 4 attached thereby by the attaching device 8, to each of the machining centers 1, so that the jig 7 is held by the workpiece chuck 30 thereof as the workpiece holding device and the workpiece 4 held by the jig 7 is machined by the each center 1, and which receives, after the machining of the workpiece 4, the jig 7 from the chuck 30 and carries out the jig 7, but also a second conveying device which returns the jig 7 from which the workpiece 4 has been removed by the removing device 9, to the attaching device 8.

In the illustrated embodiment, each workpiece 4 is machined by all of the machining centers 1 belonging to the machining line. However, this is not essentially required. For example, it is possible that a certain sort of workpieces 4 be machined by only a portion of the machining centers 1, even only one of the centers 1. In the last case, the machining centers 1 may be so operated as to perform a same machining operation in respective machining cycles that are deviated from each other by a prescribed time. Since the machining centers 1 need to replace a current jig 7 holding a current workpiece 4, with a new jig 7 holding a new workpiece, at different timings, the single robot 2 can smoothly replace, for each of the machining centers 1, its current jig 7 with a new jig 7, at a corresponding one of the different timings.

In addition, in the illustrated embodiment, the main body 52 of the jig 7 has the rectangular shape in its plan view. However, this is not essentially required, either. For example, the main body 52 may have a circular shape in its plan view. In this case, the carrier chuck 46 or the workpiece chuck 30 may be provided by a well known three-jaw chuck.

In addition, the carrier chuck 46 and the workpiece chuck 30 may be provided by two identical chucks having an identical structure and an identical size. In the last case, the robot 2 and the workpiece spindle 20 may be provided with the two identical chucks, respectively, in such a manner that the two identical chucks are opposed to each other with the total, six jaws thereof being spaced from one another equiangularly, i.e., at a regular angular pitch of 60 degrees. In this state, the two identical chucks exchange the jig 7 with each other. In addition, the fixing device of the attaching device 8 or the removing device 9 may be provided by a three-jaw chuck.

Figure 11:
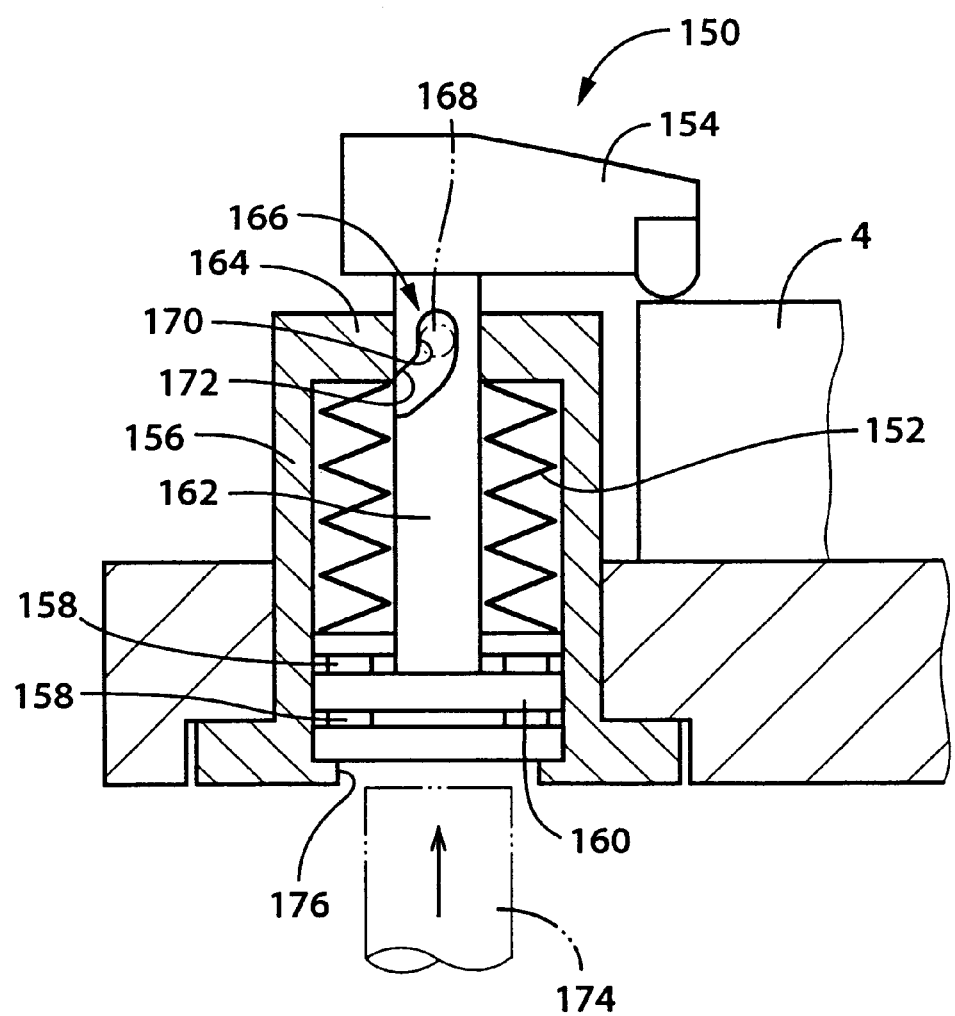
FIG. 11 is a cross-sectioned, front elevation view of each of two clamping devices of a workpiece-hold jig as part of another machining system as a second embodiment of the present invention.

FIG. 11 shows a second embodiment of the present invention that relates to a clamping device 150 which may be employed, in the machining system shown in FIG. 1, in place of each of the two clamping devices 58 of the jig 7 shown in FIG. 6. The present clamping device 150 includes disc springs 152 as a sort of elastic member as a biasing device that apply a biasing force or a clamping force, to a clamp member 154. In addition, the clamping device 150 includes a main body 156 which accommodates a spring seat 160 which is sandwiched by two thrust bearings 158. An output rod 162 projects from the spring seat 160, such that the rod 162 is coaxial with the seat 160 and a top end portion of the rod 162 extends outward through a top wall 164 of the main body 156. The clamp member 154 is fixed to the top end portion of the output rod 162, such that the clamp member 154 extends substantially perpendicularly to the rod 162. The output rod 162 has a guide groove 166 which is formed in an outer circumferential surface of the rod 162, and a guide pin 168, indicated at two-dot chain line, which is fixed to the main body 156 is fitted in the guide groove 166. The guide groove 166 includes an axial portion 170 extending parallel to the axis line of the output rod 162, and an inclined portion 172 inclined relative to the axis line.

Meanwhile, each of the attaching device 8 and the removing device 9 is provided with a release member 174 indicated at two-dot chain line in FIG. 11. The release member 174 is moved along the axis line of the output rod 162, by an appropriate drive device, such as a hydraulic cylinder, or a combination of a feed screw, a nut, and an electric rotary motor, so that the release member 174 presses the lower thrust bearing 158 via an opening 176 formed through the bottom wall of the main body 156. Consequently the release member 174 applies an external force to the spring seat 160 via the bearings 158, against the biasing force of the disc springs 152, and the seat 160 is moved toward the top wall 164 of the main body 156. Thus, the top end portion of the output rod 162 projects outward from the main body 156 of the clamping device 150. Initially, the rod 162 is simply moved in the axial direction, without being rotated, since the guide pin 168 is engaged with the axial portion 170 of the guide groove 166. When the pin 168 is moved and engaged with the inclined portion 172 of the groove 166, the rod 162 is moved in the axial direction while being rotated. Thus, the clamp member 154 is moved in a direction perpendicular to a surface of the workpiece 4, in a range near to the workpiece 4, and is moved while being rotated, in a range distant from the same 4. Thus, a space above the workpiece 4 is fully freed of the clamp members 154 of the two clamping devices 150 of the jig 7, after the clamp members 154 are moved by only respective small strokes. When the output rod 162 is rotated, the spring seat 160 is also rotated. However, the spring seat 160 bears the disc springs 152 via the upper thrust bearing 158 and receives the release member 174 via the lower thrust bearing 158, the seat 160 is lightly rotated, without resisting to the rotation of the rod 162.

Figure 12:
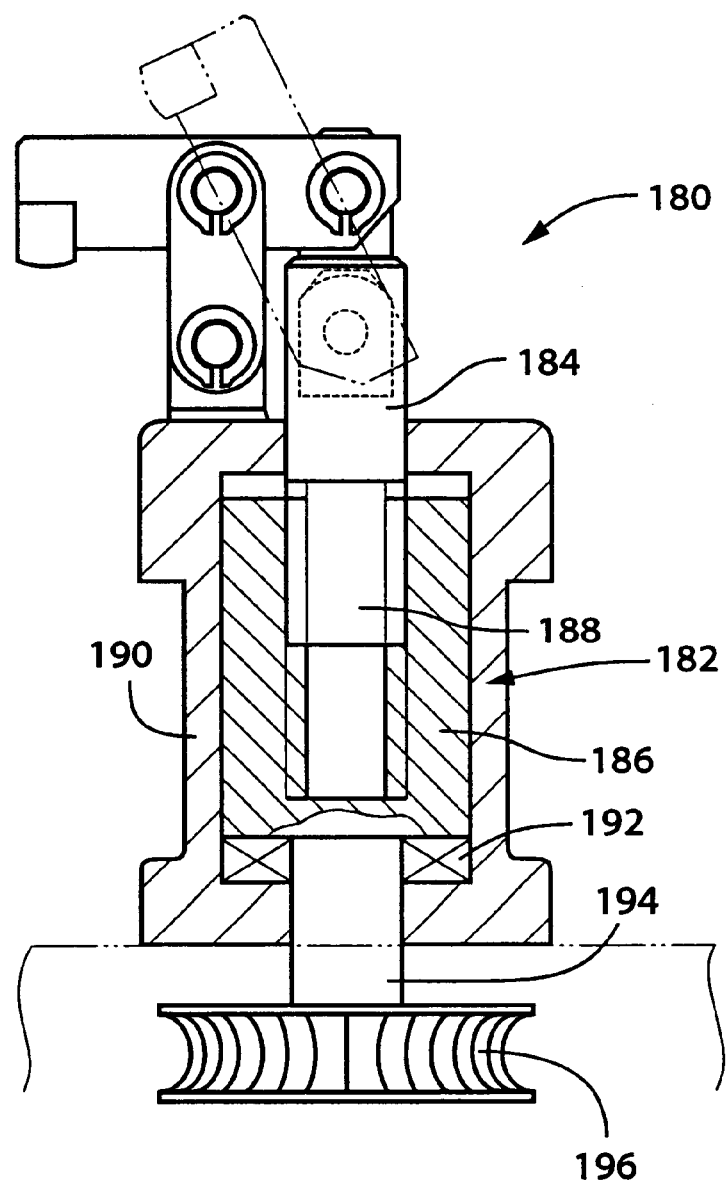
FIG. 12 is a cross-sectioned, front elevation view of each of two clamping devices of a workpiece-hold jig as part of another machining system as a third embodiment of the present invention.
Figure 13:
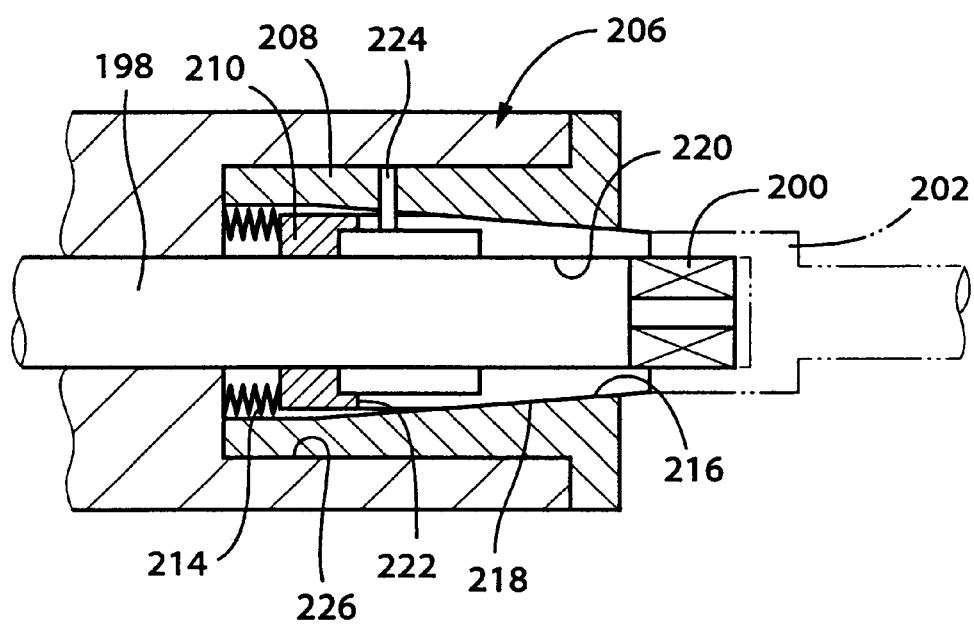
FIG. 13 is a cross-sectioned, front elevation view of a drive device which drives each clamping device of FIG. 12.

FIGS. 12 and 13 show a third embodiment of the present invention that relates to a clamping device 180 which may be employed, in the machining system shown in FIG. 1, in place of each of the two clamping devices 58 of the jig 7 shown in FIG. 6. The present clamping device 180 includes a screw mechanism 182 which moves an output rod 184 in opposite directions along an axis line thereof. The screw mechanism 182 includes an internally threaded member 186 and an externally threaded member 188 which are threadedly engaged with each other. The two threaded members 186, 188 may be common threaded members whose thread ridges are subjected to sliding contact. Alternatively, the screw mechanism 182 may be a ball-screw mechanism which has a number of balls between the two threaded members 186, 188. A main body 190 of the clamping device 180 accommodates the internally threaded member 186, such that the member 186 is rotatable about the axis line of the output rod 184 and is supported by a thrust bearing 192. The externally threaded member 188 is coaxial, and integral, with the output rod 184, and the internally threaded member 186 is coaxial, and integral, with a rotary shaft 194 which is rotatably supported by the main body 52 of the jig 7 via a bearing, not shown. A worm wheel 196 is fixed to the rotary shaft 194. The main body 52 of the jig 7 additionally supports a drive shaft 198, shown in FIG. 13, via a bearing, not shown, such that the drive shaft 198 is rotatable and is not movable in directions parallel to an axis line thereof.

One end portion of the drive shaft 198 provides a quadrangular (or hexagonal) engageable portion 200, and an operator engages a wrench member 202, such as a box wrench, with the engageable portion 202 of the drive shaft 198, and thereby rotates the drive shaft 198. A brake device 206 like a collet chuck prevents a free or random rotation of the drive shaft 198. The brake device 206 includes a tapered member 208 fixed to the main body 52 of the jig 7; a collet 210, and disc springs 214. The tapered member 208 has a generally cylindrical, hollow shape, and has a tapered inner surface 216 as a portion of an inner circumferential surface thereof. The collet 210 has a tapered outer surface 218 corresponding to the tapered inner surface 216; a cylindrical inner surface 220; and a plurality of expanding grooves 222 each extending from an exposed end of the collet 210 to a position near an inside end thereof opposite to the exposed end. Thus, the diameter of the exposed end of the collet 210 is reducible. A rotation of the collet 210 relative to the tapered member 208 is prevented because an engaging pin 224 fixed to the tapered member 208 is fitted in one of the expanding grooves 222. Thus, the engaging pin 224 and the one expanding groove 222 cooperate with each other to provide a relative-rotation preventing device. The disc springs 214 are provided between an end surface of the collet 210 and a bottom surface of a counter bore 226, such that the springs 214 are given a pre-set load. Thus, the springs 214 bias the collet 210 toward an open end of the counter bore 226. The disc springs 214 are a sort of elastic member as a biasing device which biases the collet 210.

The wrench member 202 is supported by an end portion of an output shaft of a rotating drive device, not shown, which is moved by a moving device in directions parallel to an axis line of the output shaft. In a state in which the wrench member 202 is engaged with the engageable portion 200 of the drive shaft 198, the wrench member 202 contacts the exposed end of the collet 210 and moves the collet 210 backward against the biasing force of the disc springs 214. Usually or normally, the tapered outer surface 218 of the collet 210 is pressed against the tapered inner surface 216 of the tapered member 208, so that the diameter of the collet 210 is kept reduced and the drive shaft 198 is strongly held by the cylindrical inner surface 218 of the collet 210. Thus, the rotation of the drive shaft 198 is prevented. On the other hand, when the collet 210 is moved backward as described above, the diameter of the collet 210 is increased or expanded, so that the drive shaft 198 is released from the collet 210. Thus, the drive shaft 198 is placed in a state in which the shaft 198 can be lightly rotated. Therefore, if, in this state, the rotating drive device is operated to rotate the drive shaft 198, the worm wheel 196 is rotated by a worm, not shown, fixed to the drive shaft 198, and the internally threaded member 186 is rotated via the rotary shaft 194. Thus, the brake device 206 provides a rotation preventing device which is switchable between a first state in which the rotation preventing device prevents the rotation of the internally threaded member 186 and a second state in which the the rotation preventing device permits the rotation of the same 186; the wrench member 202 provides a brake-releasing member; and the moving device which moves the rotating drive device provides a brake-releasing-member moving device.

It is to be understood that the present invention may be embodied with various changes, modifications, and improvements, such as those described in SUMMARY OF THE INVENTION, that may occur to a person skilled in the art, without departing from the spirit and scope of the invention defined in the appended claims.

What is claimed is:

1. A machining system, comprising:
    at least one machining device which includes a workpiece holding device which holds a workpiece, a tool holding device which holds a tool, and a moving device which causes a relative movement between the workpiece held by the workpiece holding device and the tool held by the tool holding device, so that the workpiece is machined by the tool;
    a jig which includes a main body and a fixing device which fixes the workpiece to the main body;
    an attaching device which attaches the workpiece to the jig so that the fixing device fixes the workpiece to the main body and thus the jig holds the workpiece;
    a first conveying device which conveys the jig holding the workpiece, to the machining device, so that the jig is held by the workpiece holding device and the workpiece held by the jig is machined by the tool; and which receives, after the machining of the workpiece, the jig from the workpiece holding device and carries out the jig from the machining device;
    a removing device which removes the workpiece from the jig carried out by the first conveying device; and
    a second conveying device which returns the jig from which the workpiece has been removed, to the attaching device.

2. A system according to claim 1, wherein the fixing device comprises a clamp member which is engageable with the workpiece; and a clamp-member moving device which moves the clamp member to an operative position thereof where the clamp member engages the workpiece and thereby fixes the workpiece to the main body of the jig, and to an inoperative position thereof away from the operative position.

3. A system according to claim 2, wherein the clamp-member moving device of the jig comprises a pressurized-liquid-operated actuator which is supplied with a pressurized liquid and moves the clamp member by utilizing a pressure of the liquid.

4. A system according to claim 3, wherein the jig further comprises a liquid passage which is communicated with the pressurized-liquid-operated actuator; and leakage preventing device which prevents, in a state in which the jig is not held by either of the attaching device and the removing device, the liquid from leaking from the liquid passage.

5. A system according to claim 4, further comprising a suction device which sucks a portion of the liquid that is present in a space outside the leakage preventing device; and an air supplying device which supplies air to said space.

6. A system according to claim 2, wherein the clamp-member moving device comprises an externally threaded member and an internally threaded member which are threadedly engaged with each other, and wherein one of the externally threaded member and the internally threaded member is connected to the clamp member and the other of the externally threaded member and the internally threaded member is rotatable about an axis line and is not movable in a direction parallel to the axis line.

7. A system according to claim 6, wherein the clamp-member moving device further comprises a rotation preventing device which is selectively switchable to a first state thereof in which the rotation preventing device prevents a rotation of said other of the externally threaded member and the internally threaded member and to a second state thereof in which the rotation preventing device permits said rotation.

8. A system according to claim 1, comprising a plurality of said machining devices which are arranged in a direction from the attaching device to the removing device.

9. A system according to claim 1, wherein the first conveying device further comprises:

a guide; and a movable robot including a movable carriage which is movable along the guide, and an operative portion which is supported by the carriage, that receives the jig holding the workpiece, from the attaching device, and attaches and detaches the jig to and from the workpiece holding device of the machining device, and transfers the jig to the removing device.

10. A system according to claim 9, wherein the second conveying device comprises the movable robot.

11. A system according to claim 9, wherein the operative portion of the movable robot comprises jig holder which holds the main body of the jig, and a workpiece holder which holds the workpiece, and selectively operates one of the jig holder and the workpiece holder.

12. A system according to claim 1, wherein the machining device comprises a machining center including (a) a tool storing and selecting device which stores a plurality of tools and selects one of the tools; and (b) a tool replacing device which automatically replaces the tool held by the tool holding device, with the tool selected by the tool storing and selecting device.

13. A system according to claim 1, wherein the fixing device of the jig continues to fix the workpiece without receiving an external action.

14. A system according to claim 2, wherein the clamp-member moving device comprises a spring member which applies an elastic force to the clamp member and thereby biases the clamp member toward the operative position thereof and a clamp-release member which moves, owing to an external force exerted thereto, the clamp member to the inoperative position thereof against the elastic force of the spring member.

15. A system according to claim 2, wherein the attaching device comprises:

a jig holding device which holds the main body of the jig;

a transferring device which transfers the workpiece to the jig held by the jig holding device; and an operating device which operates the clamp-member moving device of the jig to move the clamp member to the operative position thereof so that the clamp member fixes the workpiece to the main body of the jig.

16. A system according to claim 2, wherein the removing device comprises:

a jig holding device which holds the main body of the jig;

an operating device which operates the clamp-member moving device of the jig to move the clamp member to the inoperative position thereof so that the clamp member releases the workpiece from the main body of the jig; and a receiving device which receives the workpiece from the jig held by the jig holding device.

* * * * *